(12) United States Patent
Ferreira Moreno et al.

(10) Patent No.: US 11,106,952 B2
(45) Date of Patent: Aug. 31, 2021

(54) ALTERNATIVE MODALITIES GENERATION FOR DIGITAL CONTENT BASED ON PRESENTATION CONTEXT

(71) Applicant: International Business Machines Corporation, Armonk, NY (US)

(72) Inventors: Marcio Ferreira Moreno, Rio de Janeiro (BR); Rafael Rossi de Mello Brandao, Rio de Janeiro (BR); Renato Fontoura de Gusmão Cerqueira, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 16/666,677

(22) Filed: Oct. 29, 2019

(65) Prior Publication Data

US 2021/0125012 A1    Apr. 29, 2021

(51) Int. Cl.
*G06K 9/62* (2006.01)
*G06N 3/04* (2006.01)
*G06N 5/02* (2006.01)
*G06F 3/01* (2006.01)
*H04L 29/08* (2006.01)

(52) U.S. Cl.
CPC ............ *G06K 9/6293* (2013.01); *G06F 3/011* (2013.01); *G06N 3/0454* (2013.01); *G06N 5/02* (2013.01); *H04L 67/303* (2013.01); *H04L 67/306* (2013.01)

(58) Field of Classification Search
CPC .... G06K 9/6293; G06F 3/011; G06N 3/0454; G06N 5/02; H04L 67/303; H04L 67/306
See application file for complete search history.

(56) References Cited

U.S. PATENT DOCUMENTS

| | | | |
|---|---|---|---|
| 7,043,474 B2 * | 5/2006 | Mojsilovic | G06K 9/6215 |
| 7,853,864 B2 | 12/2010 | Ro et al. | |
| 8,918,431 B2 | 12/2014 | Mark et al. | |
| 9,552,339 B1 | 1/2017 | Kessenger et al. | |
| 9,788,349 B2 | 10/2017 | Levien et al. | |
| 9,946,739 B2 * | 4/2018 | Haddock | G06F 16/22 |
| 10,078,651 B2 | 9/2018 | Kelly et al. | |
| 2005/0265607 A1 * | 12/2005 | Chang | G06K 9/6293 |
| | | | 382/224 |

(Continued)

OTHER PUBLICATIONS

Truong Cong Thang et al.,"Effective Adaptation of Multimedia Documents with Modality Conversion", Signal Processing: Image Communication, vol. 20, Issue 5, Jun. 2005.

(Continued)

*Primary Examiner* — David Bilodeau
(74) *Attorney, Agent, or Firm* — Patterson + Sheridan, LLP

(57) ABSTRACT

A system and associated processes may generate new modalities by receiving content associated with an original modality. An appropriateness of an alternative modality may be determined based on at least one of a device available to present the content, a user profile, and a contextual factor regarding an environment of a user intended to receive the content. Source content semantics associated with the content may be automatically determined, and an alternative modality based on the determined source content semantics may be generated and used to present the content to the user.

20 Claims, 5 Drawing Sheets

(56) References Cited

U.S. PATENT DOCUMENTS

| | | | | |
|---|---|---|---|---|
| 2006/0290709 | A1* | 12/2006 | Omi | G10L 15/19 |
| | | | | 345/594 |
| 2008/0147515 | A1* | 6/2008 | Abraham | G06Q 30/0603 |
| | | | | 235/383 |
| 2017/0201562 | A1* | 7/2017 | Moon | G06F 16/435 |
| 2019/0065589 | A1* | 2/2019 | Wen | G06F 16/35 |
| 2019/0236394 | A1* | 8/2019 | Price | G06N 3/084 |
| 2020/0215695 | A1* | 7/2020 | Cristache | G06N 20/00 |

OTHER PUBLICATIONS

Groger, Christoph, et al., "The Manufacturing Knowledge Repository," Consolidating Knowledge to Enable Holistic Process Knowledge Management in Manufacturing, Proceedings of the 16th International Conference on Enterprise Information Systems (ICEIS), 2014, 13 pages.

Gong, Dihong, "Towards Building Large-Scale Multimodal Knowledge Bases," pp. 2-35.

Li, Huadong, et al., "Multimodal Question Answering over Structured Data with Ambiguous Entities," Proceedings of the 26th International Conference on World Wide Web Companion, pp. 79-88, International World Wide Web Conferences Steering Committee, 2017.

Qi, Fan, et al., "A Unified Framework for Multimodal Domain Adaptation," 2018 ACM Multimedia Conference on Multimedia Conference, pp. 429-437, ACM, 2018.

IBM, "List of IBM Patents or Patent Applications Treated As Related," for U.S. Appl. No. 16/666,667, filed Oct. 29, 2019, 2 pages.

U.S. Appl. No. 16/666,747 "Multimodal Knowledge Consumption Adaptation Through Hybrid Knowledge Representation," filed Oct. 29, 2019.

\* cited by examiner

ALTERNATIVE MODALITIES GENERATION FOR DIGITAL CONTENT BASED ON PRESENTATION CONTEXT

BACKGROUND

The present invention relates to computing systems, and more specifically, to processes for enhancing human and computer interaction.

A modality is a classification of a single independent channel of sensory input/output between a computer and a human. For instance, a computer may receive and interactively use audio, tactile, or visual input, each comprising a modality. Multiple modalities can be used in combination to provide complementary methods to convey information more effectively. For example, artificial intelligence may combine speech understanding with lip-reading and hand gestures to add context. A single modality can thus be combined with others to glean a more accurate or a deeper meaning. When combinations are possible, they can enhance computer-human interaction because certain modalities are more effective at expressing specific types of information than others.

Despite the promise of such technologies, however, implementations can fall short of their potential when the nature of digital content limits the modality of the information that is being conveyed. For instance, users can be limited to consume content in the modality it was created, making it difficult to experience depending on their context and needs. For example, some content cannot be exploited on an available device. For instance, a scent modality may not be communicated via a cell phone. In another scenario, content may not be designed to support a user's needs, such as for a vision or a hearing impaired consumer.

SUMMARY

According to one embodiment of the present invention, a method of generating modalities may include receiving content associated with an original modality. An appropriateness of an alternative modality may be determined based on at least one of a device available to present the content, a user profile, and a contextual factor regarding an environment of a user intended to receive the content. Source content semantics associated with the content may be automatically determined, and an alternative modality based on the determined source content semantics may be generated and presented to a user.

According to another particular embodiment, a system may include an input/output device to receive content associated with an original modality and a context monitor module to determine an appropriateness of an alternative modality based on at least one of a device available to present the content, a user profile, and a contextual factor regarding an environment of a user. The system further may include a content processor module to source content semantics associated with the content, a modality generation manager module to generate an alternative modality based on the determined source content semantics, and a graphic user interface module to present the content to the user using the alternative modality.

According to another particular embodiment, a computer program product for creating a modality may include a computer-readable storage medium having computer-readable program code embodied therewith, the computer-readable program code executable by one or more computer processors to: receive content associated with an original modality; determine an appropriateness of an alternative modality based on at least one of a device available to present the content, a user profile, and a contextual factor regarding an environment of a user; determine source content semantics associated with the content; generate an alternative modality based on the determined source content semantics, and use the alternative modality to present the content to the user.

DETAILED DESCRIPTION

Figure 1:
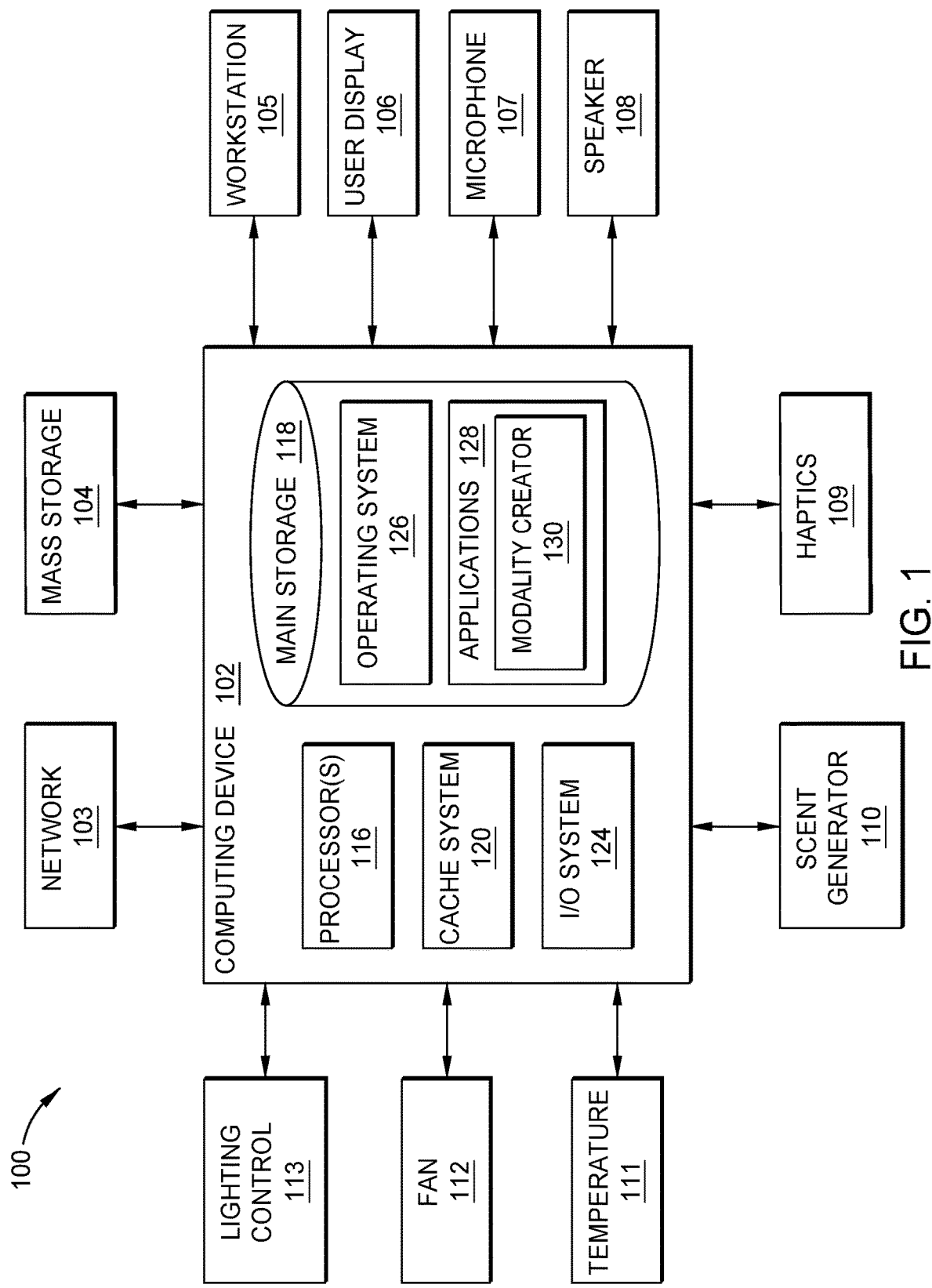
FIG. 1 is a block diagram of a system configured to create alternative modalities in real-time.

An embodiment of a system automatically enriches content with alternative modalities according to user, device, and environmental characteristics using artificial intelligence and content semantics. The system may provide high production and availability of traditional and nontraditional digital content that does not limit experiences to common modalities of visual and audible sensations. The system may enhance a source of the content by learning about it using artificial intelligence. The automatically gleaned understanding may be used to create alternative modalities according to determined user needs, device characteristics, and environmental parameters.

Instead of only trying to combine already existing modalities (and being constrained to traditional modalities), an embodiment of the system may automatically enrich content with alternative modalities according to user, device, and environmental characteristics using artificial intelligence and content semantics. An implementation may receive, generate, and output real-time content generation along with user, device, and environment aspects in real-time.

An embodiment of a system may explore all communicative channels and modalities available to digital content. The system may process in real-time all content being transmitted or presented to generate alternative modalities. To this end, the system may employ artificial intelligence to learn source content semantics. The system may automatically create proper complimentary modalities that were not previously considered. For example, the system may process the source content and apply generative adversarial networks. In a traditional generative adversarial network, two neural networks may contest with one another to generate new data.

In an alternative modality generation process, different conditions may be automatically considered, such as current preferences of a user. The program code executed by the system may receive input based on characteristics of devices used to present the content and the environment of the user. Reading text, listening to audio, watching videos, sensing haptics, smelling scent, and other modalities may yield different experiences and capacities that may be used by the system to inform consumers.

An embodiment of the system may have particular application where one or more of modalities may be blocked or constrained. For instance, the system may provide valuable context where an environment is operating in a silent ambient mode. In such a scenario where audio is not an option, textual and haptics may be preferred.

An embodiment of the system may generate alternative modalities that are pertinent to a user. In one example, a movie showing a scene with a freshly baked apple pie may be detected. In conjunction with the detected pie, a new type of content may be created that includes generating a scent delivered by an actuator on the viewer ambient (i.e., collective computing devices). An implementation may learn and create modalities by identifying and correlating monomodal content semantics to original content. The knowledge involved in generating new modalities may include symbolic descriptions represented in a knowledge base.

An embodiment of the system may enrich content by using alternative modalities according to a user configuration. For instance, the system may create an alternative multimodal content presentation according to user, device, and environmental characteristics. The system may use artificial intelligence to learn content semantics and to enrich input through multimodality creation based on the environmental characteristics and a user profile.

In one implementation, a first user may record and send an audio message to a second user. The system may sense that the second user is located in a conference room and is attending a meeting. As such, the system may determine that the audio modality of the audio message is not proper for the detected environment. In response, the system may use a multimodal generator to create alternative modalities according to the sensed environment, device, and user profile, where desired. In such a case, an alternative modality might include converting the audio into text or a notification for display on the phone of a user.

In another scenario, a user may be watching a television monitor and may have different devices located around them. The system may sense those devices in the environment and detect those having particular application with the television program being viewed. For instance, the system may detect a haptic and a scent generating device. In response, the system may create alternative modalities according to the sensed environmental devices and a user profile. In an example, a stored user profile accessed by the system may indicate a preference of the user to have his or her chair (e.g., including a haptic device) vibrate in response to an on-screen commotion. Similarly, the profile may indicate that the scent generating device may be engaged to create an evergreen scent to coincide with scenery shown in the video.

In another example, a user may be watching television and may have different devices connected around them. The system of an embodiment may detect that the audience has a sensory impairment. For instance, the audience member may be vision impaired or hearing impaired. The system may recognize this by detecting certain devices associated with the impairment or the system may access the profile of the user. Based on the determination of the impairment, the system may utilize a multimodal generator to create alternative modalities according to at least one of the sensed environment devices and the user profile.

According to a particular embodiment, the system may automatically process in real-time all content being consumed to determine whether there is a need to generate alternative modalities. The system may use artificial intelligence to understand source content semantics and create proper and complementary modalities that have not been previously considered. For instance, the system may apply generative adversarial networks that may reuse existing content available in repositories. The system may consider different conditions, such as a user's preference, characteristics of a device used to present the content, as well as other environmental and contextual aspects.

FIG. 1 is a block diagram of a system 100 configured to create alternative modalities in real-time. The system 100 may include a computing device 102 in communication with other electronic devices 103-113. For instance, the computing device 102 may be in communication with a communications network 103, such as the Internet or an intranet, a mass storage device 104, a workstation or other computing device 105, and a user display 106. Other illustrative connected devices may include a microphone 107, an audio producing device 108 (e.g., a speaker), a haptics device 109, a scent emitting device 110, a thermostat device 111, a wind machine device 112, as well as a light emitting and controlling device 113.

The connected devices 103-113 may be configured to provide input to the computing device 102. The input may come from a user, such as spoken or motion input. The input may additionally or alternatively originate from programming being played back on or streamed through a device. The devices 103-113 may also be configured to provide output to the user. For instance, the haptics device 109 may vibrate according to streamed movie content and preferences included in a stored user profile.

The computing device 102 generically represents, for example, any of a number of multi-user computers such as a network server, a midrange computer, a mainframe computer, etc. However, it should be appreciated that other embodiments of the system may be implemented in other computers and data processing systems. For example, other embodiments of a system may include single-user computers such as workstations, desktop computers, portable computers, and the like, or in other programmable electronic devices (e.g., incorporating embedded controllers and the like), such as set top boxes, game machines, etc.

The computing device 102 generally includes one or more system processors 116 coupled to a main storage 118 through one or more levels of cache memory disposed within a cache system 120. Furthermore, a main storage 122 may be coupled to a number of the external devices 103-113 via a system input/output (I/O) system 124. Any number of alternate computer architectures may be used in the alternative.

Also shown resident in main storage 118 is a typical software configuration for a computer, including an operating system 126 (which may include various components such as kernels, device drivers, runtime libraries, etc.) accessible by one or more applications 128. Implementations may be realized with or without dedicated hardware components and/or modifications to conventional hardware components, and in particular, purely via software executing on a conventional hardware platform.

In addition, various program codes described hereinafter may be identified based upon the application within which it is implemented in a specific embodiment of an implementation. However, it should be appreciated that any particular program nomenclature that follows is used merely for convenience, and thus the implementations should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments are not limited to the specific organization and allocation of program functionality described herein.

Those skilled in the art will recognize that the illustrative environment illustrated in FIG. 1 is not intended to limit the scope of other implementations. Indeed, those skilled in the art will recognize that other alternative hardware and/or software environments may be used in a manner consistent with other implementations of embodiments.

Figure 2:
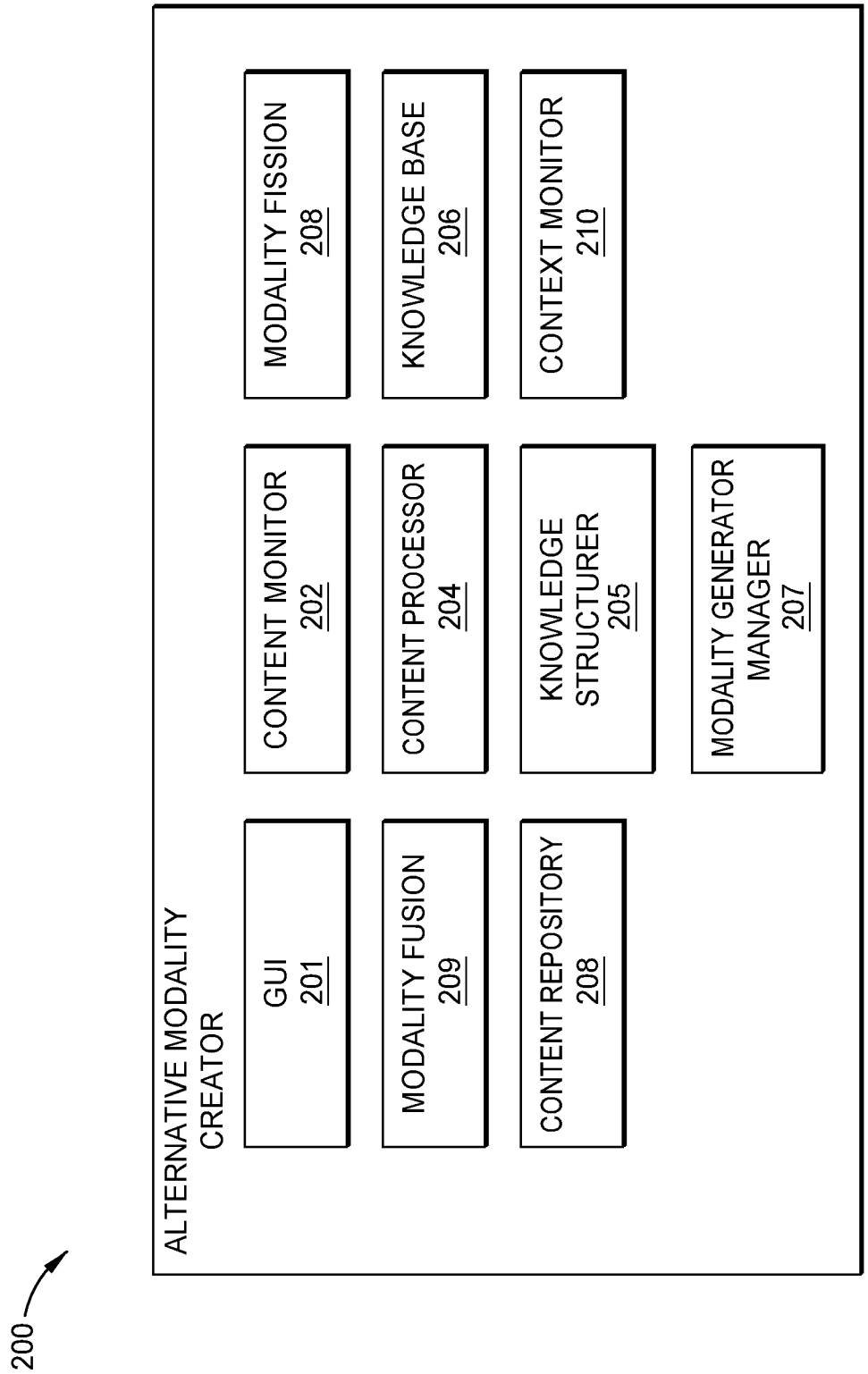
FIG. 2 is a block diagram showing a module of the system of FIG. 1 in more detail according to an embodiment.

FIG. 2 is a block diagram of a system 200 according to an embodiment. The system 200 may be similar to the alternative modality creator module 110, shown in FIG. 1. The system 200 may include a dashboard graphic user interface (GUI) 201 and a content monitor 202. Other components of the system 200 may include modality fission 203 and modality fusion modules 209. The system 200 may include a content processor 204, as well as a knowledge base module 206 and a content repository module 208. A modality generator manager module 207 may also be included in the system 200. As shown in FIG. 2, the system may also include a knowledge structurer 205 and a context monitor 210.

An embodiment of the dashboard GUI 201 may allow a user to interact with the system by specifying which modalities they wish to enable or otherwise experience. The processes of the dashboard GUI 201 may additionally be automatic. For example, a video player of the user may be coupled to the dashboard GUI 201 and automatically identified or specified in a profile of the user.

The context monitor 210 of FIG. 2 may be configured to detect certain devices and users that are present. The content monitor module 202 may be configured to capture and deliver the content to the multimodality fission module 203.

The multimodality fission module 203 of FIG. 2 may be configured to decouple and deliver the content to the content processor module 204. The content processor module 204 may be configured to extract the monomodal content semantics. The extracted monomodal context semantics may be delivered to a knowledge structurer module 205.

The knowledge structurer module 205 may be configured to correlate monomodal content semantics to the original content. For example, the knowledge structurer module 205 of FIG. 2 may create modality identifiers and store the results in the knowledge base module 206. The knowledge structurer module 205 of FIG. 2 may further notify the modality generation manager module 207 about the new content.

The modality generation manager module 207 may create or reuse alternative content from the content repository module 208. The knowledge base module 206 may be queried by artificial intelligence mechanisms. The modality fusion module 209 of FIG. 2 may be configured to couple modalities after determining that more than one modalities are available.

Figure 3:
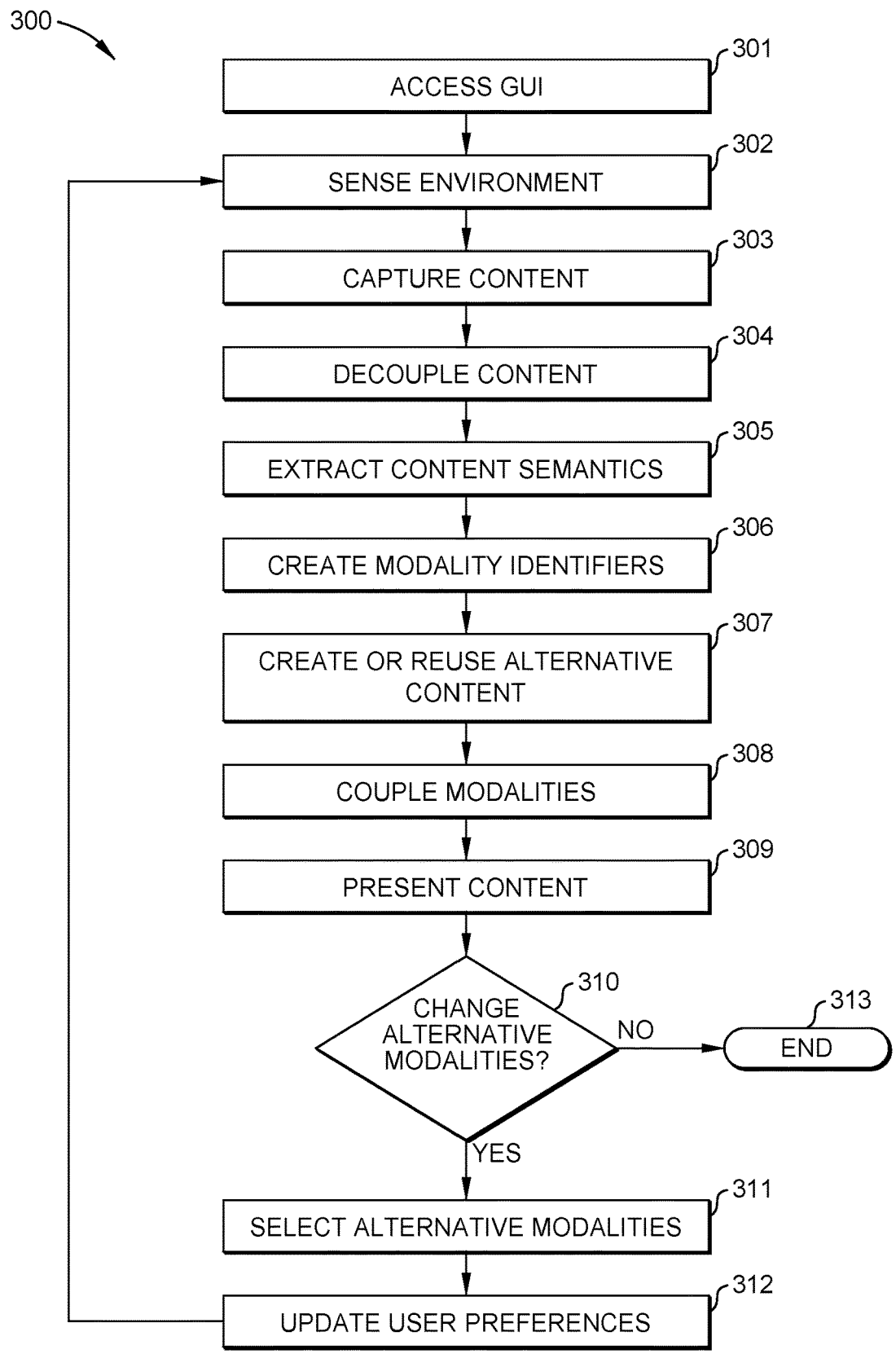
FIG. 3 is a flowchart of an embodiment of a method of creating alternative modality content.

FIG. 3 is a flowchart of an embodiment of a method 300 of creating alternative modality content. The processes of the flowchart may be performed by the systems 100, 200 of the embodiments shown in FIGS. 1 and 2. For instance, the knowledge structurer module 205, the context monitoring module 210, and the modality generator manager module 207 of FIG. 2 may have particular application, along with the dashboard GUI 201 to realize an embodiment of the method 300.

Turning more particularly to the processes of the flowchart of FIG. 3, a dashboard GUI may be accessed at 301 to consume a content. For instance, a user may access the dashboard GUI 201 of the system 200 of FIG. 2 to experience a content.

At 302, the system may sense an environment for creating modalities, including devices and users. For example, the context monitor 210 of FIG. 2 may detect certain devices and users that are present.

The system may capture the content at 303 and deliver it to a multimodality fission module. An illustrative multimodality fission module 208 is illustrated in the system 200 of FIG. 2. Continuing with the embodiment of the system 200 of FIG. 2, the content monitor module 202 may capture and deliver the content.

The system may decouple the content at 304 and deliver each decoupled monomodal content to an appropriate content processor. In one scenario, the multimodality fission module 203 of FIG. 2 may decouple and deliver the content to a content processor, such as the content processor module 204.

At 305, each content processor may extract the monomodal content semantics. The extracted monomodal context semantics may be delivered to a knowledge structurer module, such as the knowledge structurer module 205 of FIG. 2. A content processor, such as the content processor 204 of FIG. 2, may extract the monomodal content.

The system may at 306 may create modality identifiers correlating monomodal content semantics to the original content. For example, the knowledge structurer module 205 of FIG. 2 may create modality identifiers and store the results in the knowledge base module 206. The knowledge structurer module 205 of FIG. 2 may further notify the modality generation manager module 207 about the new content.

At 307, the system may create or reuse alternative content using available artificial intelligence mechanisms. The system may query the knowledge base about current content being handled as it concerns user preferences, devices and environment. Continuing with the example of FIG. 2, the modality generation manager module 207 may create or reuse alternative content from the content repository module 208. Available artificial intelligence mechanisms may include generative adversarial networks (GANs), and the knowledge base module 206 may be queried.

At 308, the system may couple modalities in response to determining whether there is more than one modality present. For instance, the modality fusion module 209 of FIG. 2 may couple modalities after determining that more than one modality is available.

The content may be presented to the user at 309. According to a particular embodiment of the method 300, the dashboard GUI 201 of FIG. 2 may present the content to the user.

The method 300 may determine whether a user wants to change alternative modalities at 310. Where a user does not want to change alternative modalities, the process may end at 311. Alternatively, where the user does want to change alternative modalities at 310, the user at 311 may be enabled to select alternative modalities using a dashboard GUI. For example, the user may select preferred modalities using the dashboard GUI 201 of FIG. 2.

At 312, the system made update user preferences creating modalities, the device being used, and environmental characteristics. According to the embodiment of the system 200 shown in FIG. 2, the knowledge structurer module 205 may update the knowledge base module 206 with such preferences. As shown in the flowchart of FIG. 3, the method 300 may continuously loop back to 202, where the content monitor may sense environment, devices and users that are present.

Figure 4:
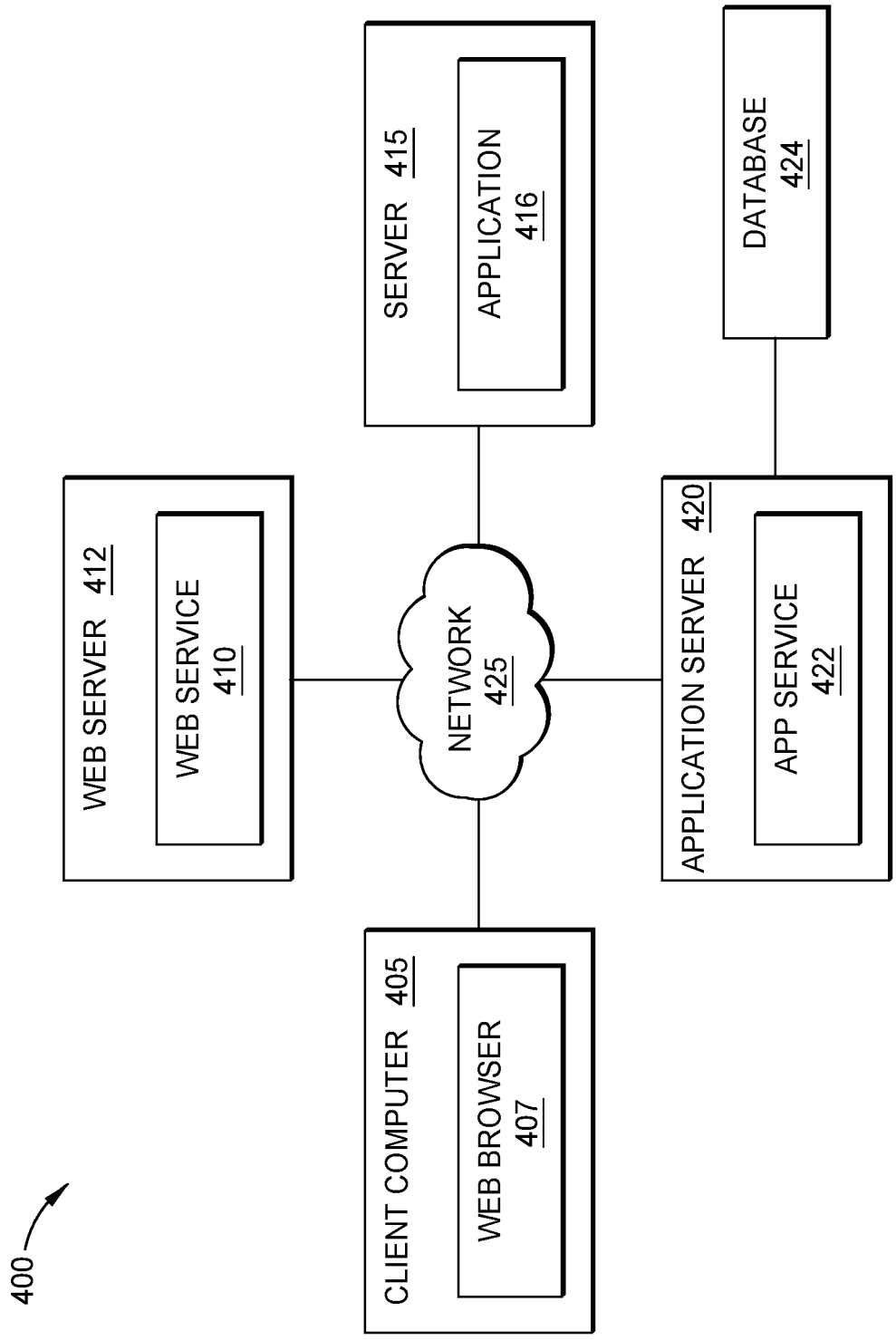
FIG. 4 illustrates another example computing system according to one embodiment, such as may be realized using a networked environment.

FIG. 4 illustrates another example computing system according to one embodiment, such as may be realized using a networked environment. As shown, the computing environment 400 includes a client computer 405, a web server 410, a server 415, an application 416, and an application server 420. The client computer 405 may be a physical system (e.g., a desktop, laptop computer, mobile device, etc.) or a virtual computing instance executing in the cloud. The client computer 405 includes a web browser 407. A user may access data services through the web browser 407 over a network 425 (e.g., the Internet).

For instance, a user may access a web service 412 executing on a web server 410. In one embodiment, the web service 412 provides a web interface for an application server 420 (e.g., executing an application service 422). More specifically, the application service 422 provides a database 424. The database 424 may include data presented to users on the web browser 407.

Figure 5:
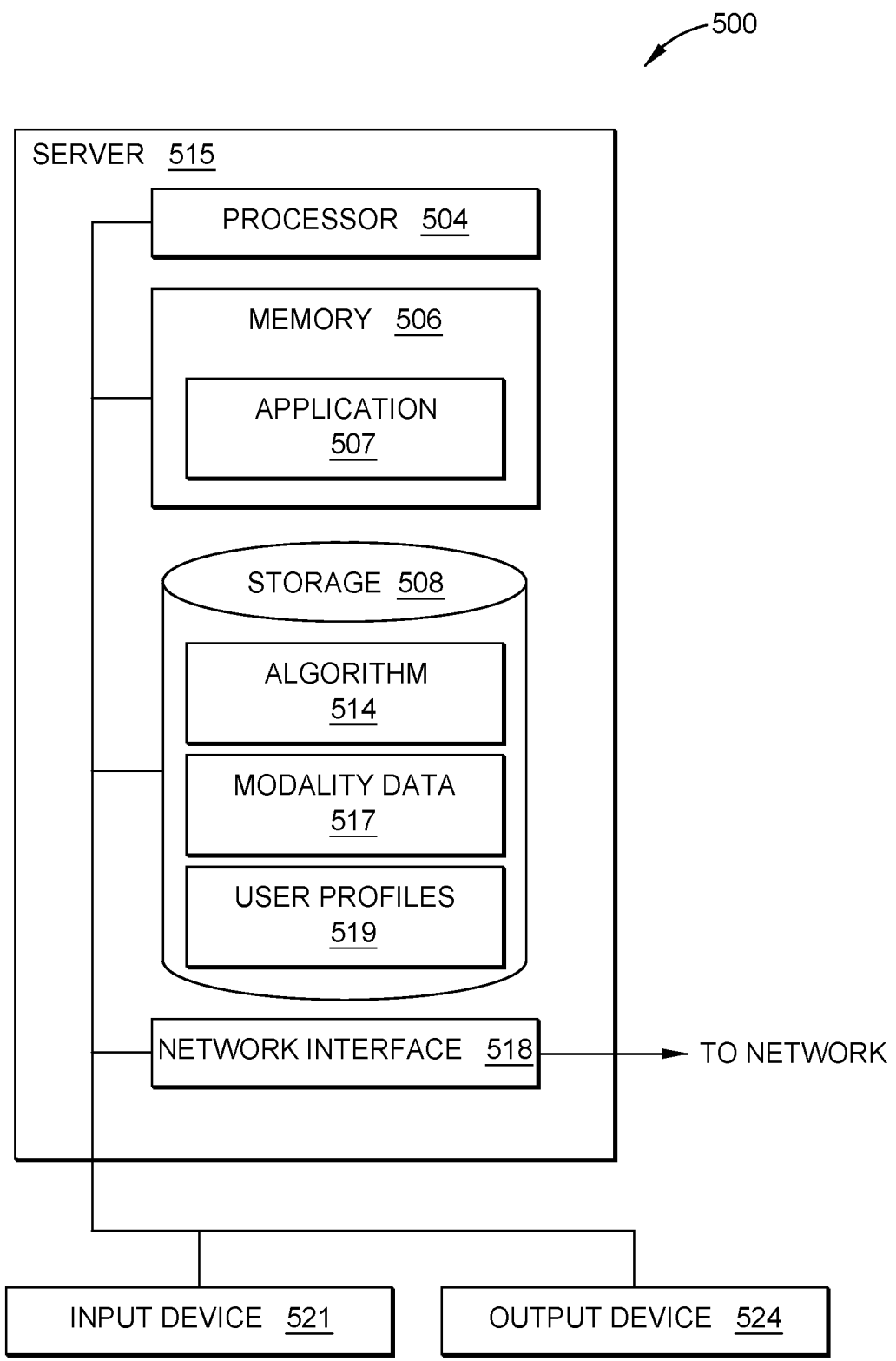
FIG. 5 further illustrates a server, such as the server of FIG. 4, according to one embodiment.

FIG. 5 further illustrates a server 515, such as the server 415 of FIG. 4, according to one embodiment. The server 515 generally includes a processor 504 connected via a bus to a memory 506, a network interface device 518, a storage 508, an input device 521, and an output device 524. The server 515 is generally under the control of an operating system. Examples of operating systems include the UNIX operating system, versions of the Microsoft Windows operating system, and distributions of the Linux operating system (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both). More generally, any operating system supporting the functions disclosed herein may be used. The processor 504 is included to be representative of a single CPU, multiple CPUs, a single CPU having multiple processing cores, and the like. Similarly, the memory 506 may be a random access memory. While the memory 506 is shown as a single identity, it should be understood that the memory 506 may comprise a plurality of modules, and that the memory 506 may exist at multiple levels, from high speed registers and caches to lower speed but larger DRAM chips. The network interface device 518 may be any type of network communications device allowing the navigation server 510 to communicate with other computers via the network 525.

The storage 508 may be a persistent storage device. Although the storage 508 is shown as a single unit, the storage 508 may be a combination of fixed and/or removable storage devices, such as fixed disc drives, solid state drives, removable memory cards, optical storage and network storage systems.

As shown, the memory 506 contains the application 517, which may be an application generally executed to take actions described herein. Storage 508 contains the algorithms 514, modality data 517, and user profiles 519.

The input device 521 may provide a keyboard and/or a mouse, etc. The output device 524 may be any conventional display screen. Although shown separately from the input device 521, the output device 524 and input device 521 may be combined. For example, a display screen with an integrated touch-screen may be used.

The descriptions of the various embodiments of the present invention have been presented for purposes of illustration, but are not intended to be exhaustive or limited to the embodiments disclosed. Many modifications and variations may be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It may be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., threshold adjustment algorithms) or related data available in the cloud. For example, the modules of FIG. 1 could execute on a computing system in the cloud and. In such a case, the threshold adjustment algorithms could adjust response thresholds and store the new values at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof. While certain embodiments are applicable to spoken language systems, the claims are not limited or even particularly applicable to spoken language interfaces. In one example, an embodiment of a method may not relate to speech modality. The scope thereof is thus determined by the claims that follow.

What is claimed is:

1. A method of generating modalities, the method comprising:
   receiving content associated with an original modality;
   determining an appropriateness of an alternative modality based on at least one of a device available to present the content, a user profile, and a contextual factor regarding an environment of a user;
   determining source content semantics associated with the content;
   generating an alternative modality based on the determined source content semantics; and
   using the alternative modality to present the content to the user.

2. The method of claim 1, further comprising receiving a user preference regarding the alternative modality, wherein the user preference is retrieved from the user profile or input by the user.

3. The method of claim 1, further comprising automatically determining at least one of the device available to present the content, the user profile, and the contextual factor regarding an environment of a user.

4. The method of claim 1, further comprising decoupling the content.

5. The method of claim 4, further comprising extracting monomodal content from the decoupled content.

6. The method of claim 1, further comprising correlating monomodal content semantics to the content.

7. The method of claim 1, further comprising using generative adversarial networks (GANs) or other appropriate technique to create the alternative modality.

8. The method of claim 1, wherein presenting the content further comprises coupling the alternative modality with a plurality of modalities.

9. The method of claim 1, further comprising determining whether the user desires to change the alternative modality.

10. A system comprising:
    an input/output device to receive content associated with an original modality;
    a context monitor module to determine an appropriateness of an alternative modality based on at least one of a device available to present the content, a user profile, and a contextual factor regarding an environment of a user;
    a content processor module to source content semantics associated with the content;
    a modality generation manager module to generate an alternative modality based on the determined source content semantics; and
    a graphic user interface module to present the content to the user using the alternative modality.

11. The system of claim 10, further comprising a context monitor module to automatically determine at least one of the device available to present the content, the user profile, and the contextual factor regarding an environment of a user.

12. The system of claim 10, further comprising a multi-modality fission module to decouple the content.

13. The system of claim 12, wherein monomodal content is extracted from the decoupled content.

14. The system of claim 10, further comprising a knowledge structurer module to correlate monomodal content semantics to the content.

15. The system of claim 10, further comprising generative adversarial networks (GANs) or other appropriate technique configured to create the alternative modality.

16. The system of claim 10, wherein presenting the content further comprises coupling the alternative modality with a plurality of modalities.

17. The system of claim 10, wherein the graphic user interface module is configured to receive user input indicating the user desires to change the alternative modality.

18. A computer-readable storage medium having computer-readable program code for creating a modality embodied therewith, the computer-readable program code executable by one or more computer processors to: receive content associated with an original modality; determine an appropriateness of an alternative modality based on at least one of a device available to present the content, a user profile, and a contextual factor regarding an environment of a user; determine source content semantics associated with the content; generate an alternative modality based on the determined source content semantics; and use the alternative modality to present the content to the user.

19. The computer program product of claim 18, wherein the computer-readable program code is further executable to receive a user preference regarding the alternative modality, wherein the user preference is retrieved from the user profile or input by the user.

20. The computer program product of claim 18, wherein the computer-readable program code is further executable to determine at least one of the device available to present the content, the user profile, and the contextual factor regarding an environment of a user.

* * * * *